US 6,664,760 B2

(12) United States Patent
Kobayashi

(10) Patent No.: US 6,664,760 B2
(45) Date of Patent: Dec. 16, 2003

(54) CELLULAR PHONE CHARGER WITH DATA BACKUP FUNCTION AND CELLULAR PHONE DATA BACKUP DEVICE

(75) Inventor: Toshihiro Kobayashi, Suzaka (JP)

(73) Assignee: God Co., Ltd., Nagano (JP)

( * ) Notice: Subject to any disclaimer, the term of this patent is extended or adjusted under 35 U.S.C. 154(b) by 11 days.

(21) Appl. No.: 09/990,351

(22) Filed: Nov. 23, 2001

(65) Prior Publication Data

US 2003/0098670 A1 May 29, 2003

(51) Int. Cl.[7] .................................................. H02J 7/00

(52) U.S. Cl. ........................................ 320/115; 320/114

(58) Field of Search ............................... 320/115, 112, 320/113, 114, 110, 107

(56) References Cited

U.S. PATENT DOCUMENTS 5,754,625 A * 5/1998 Shimura .................. 455/554.1

* cited by examiner

*Primary Examiner*—Lawrence Luk
(74) *Attorney, Agent, or Firm*—Mattingly, Stanger & Malur, P.C.

(57) ABSTRACT

A cellular phone charger having not only a charging function of charging a cellular phone but also a data backup function of backing up various data stored in the cellular phone and writing backup data to the cellular phone. The charger is equipped with a telephone memory control unit having a memory for storing various data stored in a cellular phone, a charging control unit for controlling charging of the cellular phone, and a voltage conversion unit for converting an input voltage that is supplied from a home power line or the like into drive voltages for the telephone memory control unit and the charging control unit.

7 Claims, 5 Drawing Sheets

US 6,664,760 B2

CELLULAR PHONE CHARGER WITH DATA BACKUP FUNCTION AND CELLULAR PHONE DATA BACKUP DEVICE

BACKGROUND OF THE INVENTION

1. Field of the Invention

The present invention relates to a charger with a data backup function and a cellular phone data backup device that read out data stored in the internal memory of a cellular phone and store them.

2. Description of the Related Art

Cellular phones are used very frequently for business purposes and personal communication nowadays and hence are now common means for communication. Cellular phones have various ancillary functions. Among those functions, a function of storing party-on-the-other-end data such as a telephone number and a function of storing data relating to the profile of an individual are very useful for calling or referring to an intended party. Particularly in the case where a cellular phone is used for a business purpose, party-on-the-other-end data themselves can also be used as customer data and hence are important to the user.

Always carried by users, cellular phones are prone to fail and be lost. Therefore, where many party-on-the-other-end data are stored in a cellular phone, they need to be managed so as not to be scattered and lost by storing them at intervals. For example, this is currently done in such a manner that party-on-the-other-end data or personal data are stored by connecting a cellular phone to a personal computer via a dedicated device.

However, in the method of storing party-on-the-other-end data or the like of a cellular phone in a computer, the user has to incorporate a device driver or use utility software. As such, this method is not easy to use particularly to users who are not familiar with handling of computers. Further, if a computer has not been booted yet when a user wants to store party-on-the-other-end data or the like there, he needs to boot the computer only for that purpose, which is very cumbersome.

SUMMARY OF THE INVENTION

The present invention has been made to solve the above problems that arise in using cellular phones. The present inventors have realized that by adding, to the charger of a cellular phone, a function of storing party-on-the-other-end data and personal data of the cellular phone, such data would easily be stored whenever necessary. An object of the invention is therefore to provide a cellular phone charger with a data backup function and a data backup device for a charger capable of storing, with very simple manipulations, data of a cellular phone that need to be stored such as party-on-the-other-end data.

According to a first aspect of the invention, a charger to be connected to a cellular phone having a memory to charge a battery of the cellular phone comprises a backup memory; a charging control unit for converting an external voltage into a charging voltage and supplying the charging voltage to the battery of the cellular phone; and a telephone memory control unit for accessing the memory of the cellular phone. The telephone memory control unit reads out data stored in the memory of the cellular phone and writes them to the backup memory, and reads out data stored in the backup memory and writes them to the memory of the cellular phone.

According to a second aspect of the invention, a data backup device to intervene between a cellular phone having a memory and a charger for supplying charging power to a battery of the cellular phone comprises a backup memory; a logic control circuit for performing control so as to read out data stored in the memory of the cellular phone, and for performing control so as to write data read out from the backup memory to the memory of the cellular phone; a memory control circuit for writing the data read out from the memory of the cellular phone to the backup memory, and for reading out the data stored in the backup memory; and an interface for performing matching of electrical characteristics between the charger and the cellular phone, and for controlling signal timing.

The invention as described above makes it possible to back up party-on-the-other-end data or personal data stored in a cellular phone or re-store backup data in the cellular phone in charging the cellular phone Therefore, the user can update backup data at intervals in daily use without recognizing backup operations. Further, the user can easily handle the charger or the data backup device even if he has no special knowledge about it.

DESCRIPTION OF THE PREFERRED EMBODIMENTS

Preferred embodiments of the present invention will be hereinafter described in detail with reference to the accompanying drawings. The embodiments are just examples for description of the invention and it is not intended to restrict the invention to the embodiments. Various modifications are possible without departing from the spirit and scope of the invention.

Figure 1:
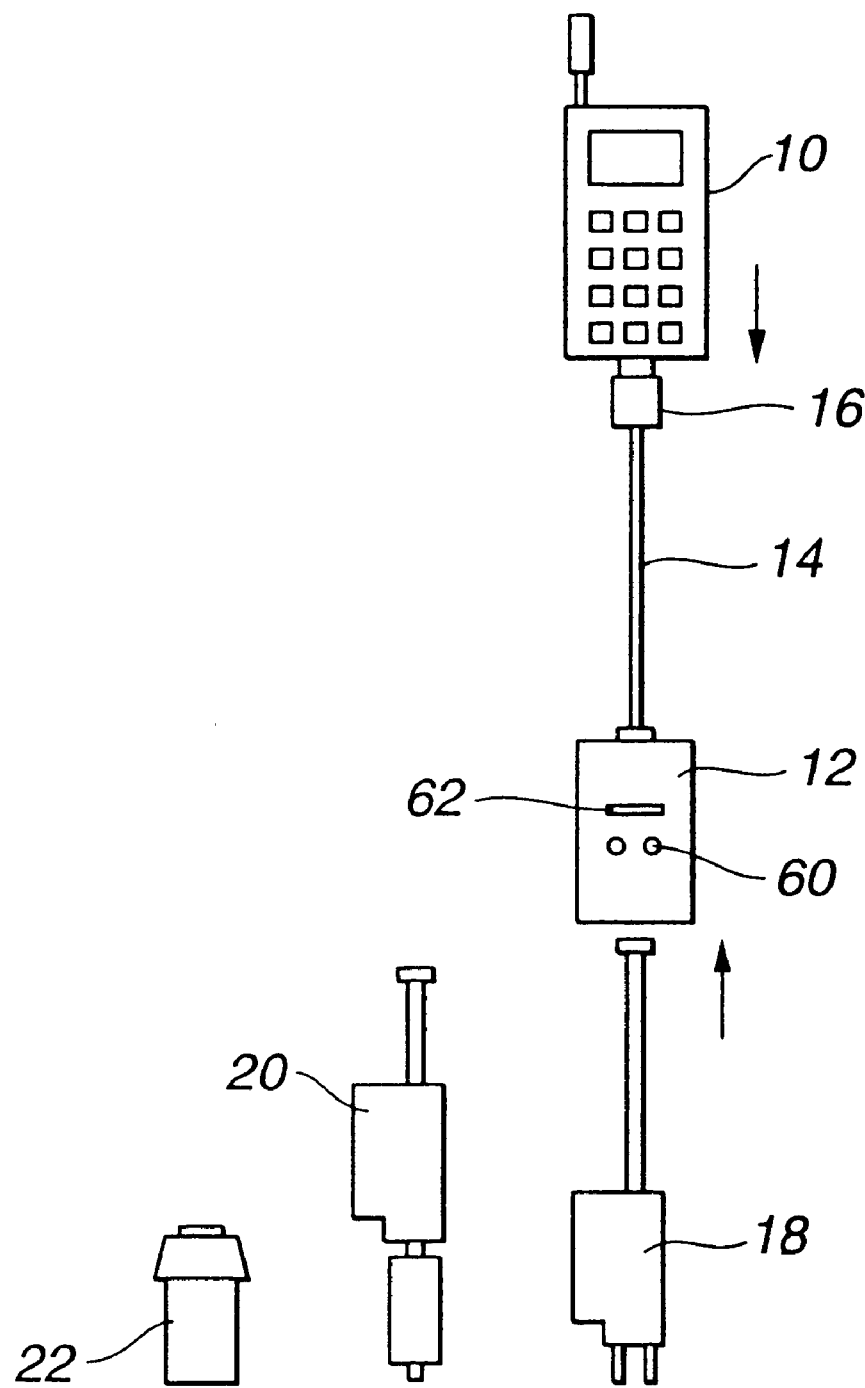
FIG. 1 shows the external configuration of a cellular phone charger with a data backup function according to the present invention.

FIG. 1 shows the external configuration of a cellular phone charger with a data backup function according to an embodiment of the invention. In FIG. 1, a cellular phone 10 has a conventional telephone communication function and Internet communication function as well as a memory function of registering and storing data relating to a party to communicate with such as a telephone number or a mail address (hereinafter referred to as "party-on-the-other-end data") and data relating to the profile of an individual (hereinafter referred to as "personal data") Although the cellular phone 10 operates being supplied with drive power that is supplied from a built-in battery, data of the above kind are stored in a rewritable nonvolatile memory which does not require drive power for its internal storage. A charger 12 is used for charging the battery of the cellular phone 10. The charger 12 is detachable from the cellular phone 10. The cellular phone 10 is electrically connected to the charger 12 in such a manner a connector 16 that is provided at the end of a cable 14 extending from the charger 12 is attached to a connector that is provided at the bottom of the cellular phone 10. As described later, the charger,12 has a backup function of reading out various data stored in the memory inside the cellular phone 10 and storing them and a re-storing function of writing various backup data to the memory inside the cellular phone 10 again. In general, the back-up function is considered valuable only in the case where backup data can be re-stored. Therefore, unless otherwise specified, in this specification the term "backup" is used as including "re-storing."

Connected to a home power socket (not shown), an AC adapter 18 supplies drive power to the charger 12. The charger 12 charges the battery by supplying the cellular telephone 10 with power originating from the home power socket. The power supplied from the home power socket also operates the charger 12 itself. In FIG. 1, a vehicular power connection unit 20 and a dry cell 22 also supplies drive power. One of the above driving power source/power supply units can be selected as appropriate and attached to the charger 12 in a detachable manner. The cellular phone 10 needs to be charged whenever necessary. Therefore, the feature that o e of the above driving power source/power supply units can be selected as appropriate in Accordance with an environment in which the cellular phone 10 is used is useful.

A manipulation unit 60 that is push buttons and an indicator 62 that is an indication lamp are provided on the top surface of the charger 12. The user can perform a desired manipulation for data backup or re-storing of backup data by manipulating the push buttons. The indicator 62 notifies the user of completion of data backup, completion of charging, or the like by an indication state of the indication lamp.

Figure 2:
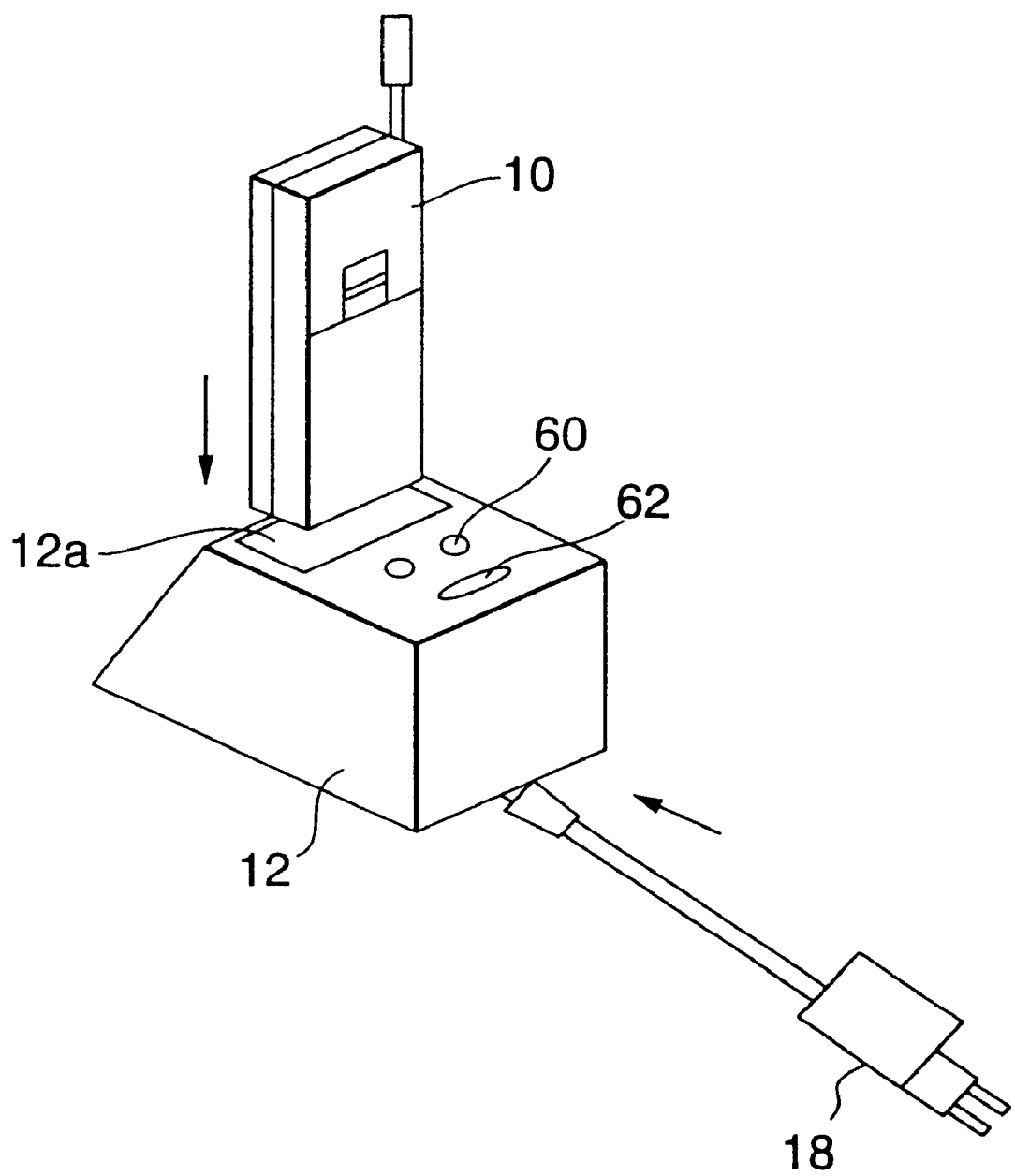
FIG. 2 shows the external configuration of a cellular phone charger with a data backup function according to another embodiment of the invention.

FIG. 2 shows the external configuration of a cellular phone charger with a data backup function according to another embodiment of the invention. This embodiment is directed to a case where the connector of a cellular phone 10 is inserted into and set in a socket 12a of a charger 12, whereby the cellular phone 10 is electrically connected to the charger 12. Although in this embodiment a home power line is used as a power source for the charger 12 and an AC adapter 18 is connected to the charger 12, another power source may be used.

Figure 3:
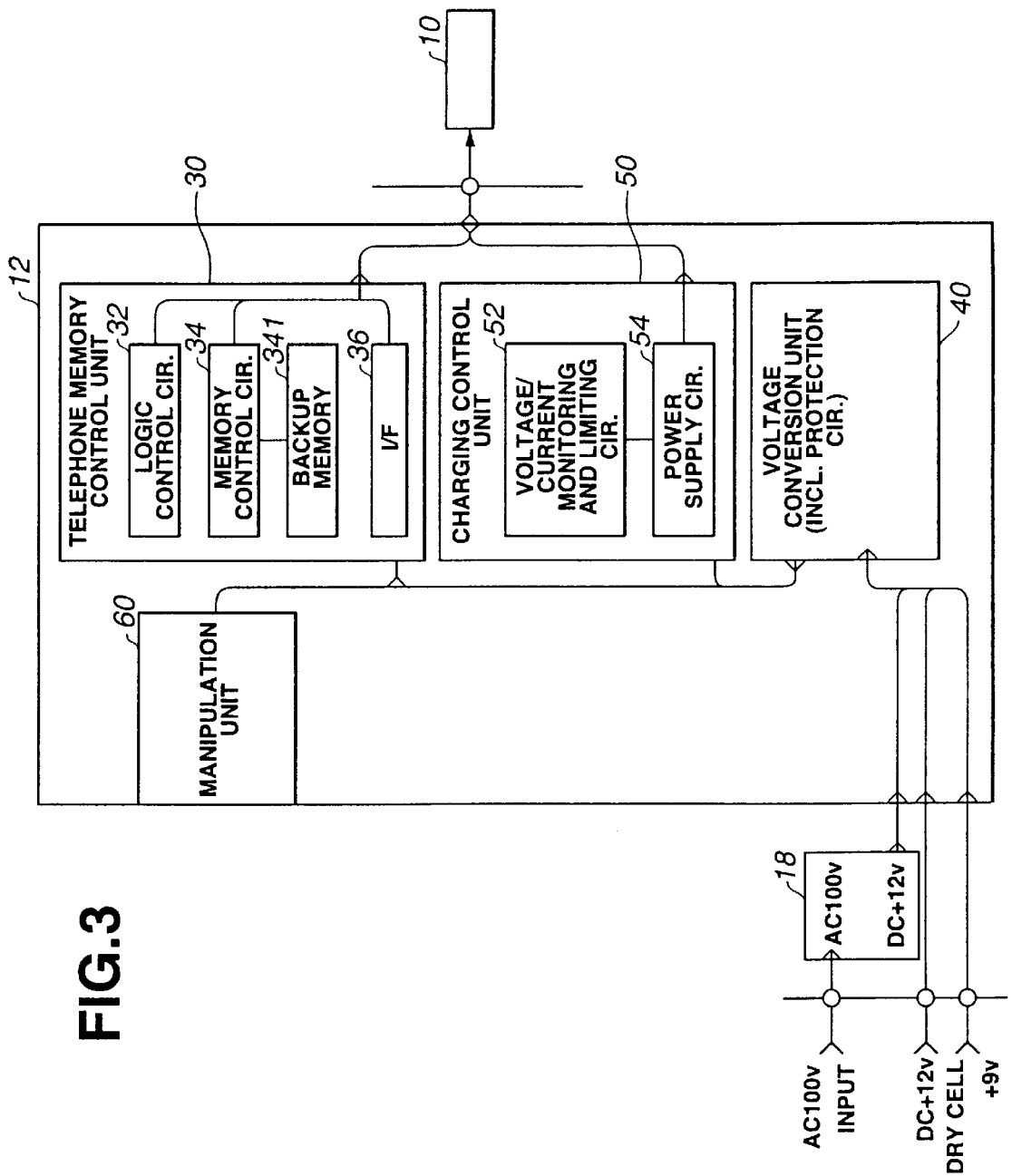
FIG. 3 is a block diagram showing the internal configuration of the cellular phone chargers of FIGS. 1 and 2.

FIG. 3 is a block diagram showing the internal configuration of the cellular phone chargers of FIGS. 1 and 2. One of the AC adapter 18, the vehicular power connection unit 20, and the dry cell 22 can be connected selectively as a power supply unit to the charger 12. The cellular phone 10 can also be connected to the charger 12. The AC adapter 18 converts Ac 100 V into DC +12 V.

The charger 12, which supplies charging power to the cellular phone 10 and backs up data, is equipped with a telephone memory control unit 30 for accessing a memory inside the cellular phone 10, a voltage conversion unit 40, a charging control unit 50, and a manipulation unit 60 to be manipulated by the user.

The telephone memory control unit 30 has a logic control circuit 32, a memory control circuit 34, and an interface 36 for controlling data exchange between the charger 12 and the cellular phone 10. The logic control circuit 32 controls an operation of automatically transferring data from the cellular phone 10 and storing them in accordance with a manipulation that is input through the manipulation unit 60 and an operation of charging the cellular phone 10. In this embodiment, selection can be made between an operation of backing up data and an operation of re-storing backup data.

The logic control circuit 32 sets as appropriate and controls such an operation relating to data backup.

Having a backup memory 341, the memory control circuit 34 performs control for capturing party-on-the-other-end data or personal data that are stored in the cellular phone 10, storing them in the backup memory 341, and re-storing the data stored in the backup memory 341 in the cellular phone 10. Various types of memories can be used as the backup memory 341. To prevent data disappearance even in the case where no drive power is supplied, it is preferable to use a rewritable nonvolatile memory (EEPROM). Such a recording medium as a hard disk drive can be used instead of a rewritable nonvolatile memory. The memory control circuit 34 also performs control for comparing data transferred from the cellular phone 10 with data existing in the backup memory 341 and storing only new or updated data,in the backup memory 341. Alternatively, the memory control circuit 34 may perform control in such a manner as to write all data to the backup memory 341 in every backup operation irrespective of whether at least part of the data are updated. The interface 36 performs matching of electrical characteristics between the charger 12 and the cellular phone 10 and adjusts signal timing.

The voltage conversion unit 40 converts a voltage that is supplied from the AC adapter 18, the vehicular power connection unit 20, or the dry cell 22 into respective voltages suitable to control the charging control unit 50 and the telephone memory control unit 30. In this embodiment, a chopper or a regulator is provided in the voltage conversion unit 40 to produce constant voltages. To enable stable control on the telephone memory control unit 30 and the charging control unit 50, the voltage conversion unit 40 is equipped with a protection circuit.

The charging control unit 50 is equipped with a voltage/current monitoring and limiting circuit 52 and a power supply circuit 54. The voltage/current monitoring and limiting circuit 52 monitors whether the voltage and current being supplied to the cellular phone 10 are within prescribed ranges and performs control so that the voltage and current are kept within the prescribed ranges. The cellular phone 10 is charged via the power supply circuit 54. Control is so made that the power supply is stopped automatically when completion of charging has been detected by the voltage/current monitoring and limiting circuit 52.

The manipulation unit 60 is so configured that a data backup operation can be controlled by manipulating push buttons. That is, the telephone memory control unit 30, the voltage conversion unit 40, and the charging control unit 50 are controlled by the user's manipulating the manipulation unit 60.

Figure 4:
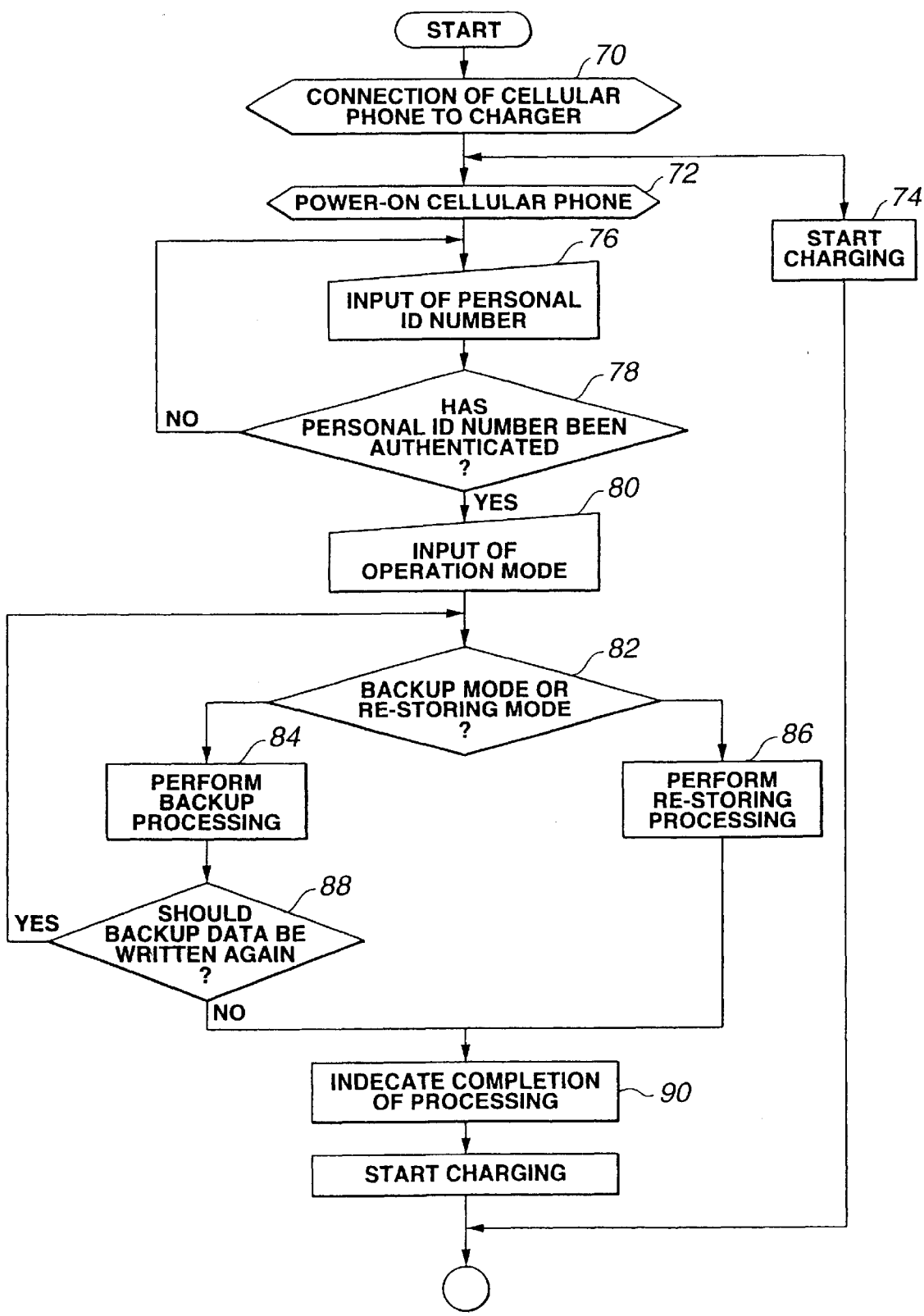
FIG. 4 is a flowchart showing the operation of the cellular phone chargers of FIGS. 1 and 2.

The operation of, and related manipulations on, the cellular phone chargers of FIGS. 1 and 2 will be described below with reference to a flowchart of FIG. 4. First, the user connects the cellular phone 10 to the charger 12 and connects the charger 12 to a power source (step 70). In the embodiment of FIG. 1, the connector 16 of the charger 12 is connected to the connector of the cellular phone 10. In the embodiment of FIG. 2, the bottom portion of the cellular phone 10 where the connector is provided is inserted into and set in the socket 12a of the charger 12.

If the user intends to do only charging of the cellular phone 10, this is the only manipulation he needs to perform. In this case, the power of the cellular phone 10 may be either on or off. After the cellular phone 10 is electrically connected to the charger 12, the charging control unit 50 controls charging. Upon completion of the charging, the indicator 62 indicates the completion of the charging. If data stored in the cellular phone 10 should be backed up, the power of the cellular phone 10 is turned on by this time point (step 72). When the cellular phone 10 in a power-on state is connected to the charger 12, whereas charging of the cellular phone 10 is started (step 74), the charger 12 is rendered in a data manipulation standby/personal identification number input waiting state. If in this state the user inputs a preset personal identification number using the dial buttons of the cellular phone 10, the personal identification number is input to the telephone memory control unit 30 of the charger 12 via the cable 14 (step 76).

Upon receiving the personal identification number from the cellular phone 10, the telephone memory control unit 30 performs a personal identification number authentication operation, that is, judges whether the input personal identification number coincides with a personal identification number that was set and stored in advance (step 78). If the telephone memory control unit 30 judges that the input personal identification number does not coincide with the stored one, the process returns to step 76, and a personal identification number input waiting state is established again. On the other hand, if the telephone memory control unit 30 judges that the input personal identification number coincides with the stored one, the telephone memory control unit 30 is rendered in an operation mode input waiting state (step 80). As described above, the charger 12 has the backup function of reading out data from the cellular phone 10 and storing them and the re-storing function of writing data thus backed up to the cellular phone 10. Step 80 is a step of causing the user to select one of a backup mode in which to back up data stored in the cellular phone 10 and a re-storing mode in which to re-store, in the cellular phone 10, backup data stored in the charger 12. For selection of an operation mode, the charger 12 can accept both of input through the push buttons of the manipulation unit 60 and input through the dial buttons of the cellular phone 10.

The telephone memory control unit 30 judges whether the selected operation mode is the backup mode or the re-storing mode (step 82). If judging that the backup mode has been selected, the telephone memory control unit 30 reads out data from the memory of the cellular phone 10 and writes them to the backup memory 341 (step 84). On the other hand, if judging that the re-storing mode has been selected, the telephone memory control unit 30 reads out data stored in the backup memory 341 and transfers them to the cellular phone 10 (step 86). The cellular phone 10 stores the transferred data in the internal memory.

Step 88 is a step of judging whether to back up the data again. There may occur a case that the data backup processing at step 84 is incomplete. Step 88 is provided to ensure that the data backup processing is performed completely. After completion of the data backup processing or the data re-storing processing, the telephone memory control unit 30 causes the indicator 60 to make a proper indication using the indication lamp and thereby notifies the user of the completion of the processing (step 90).

Figure 5:
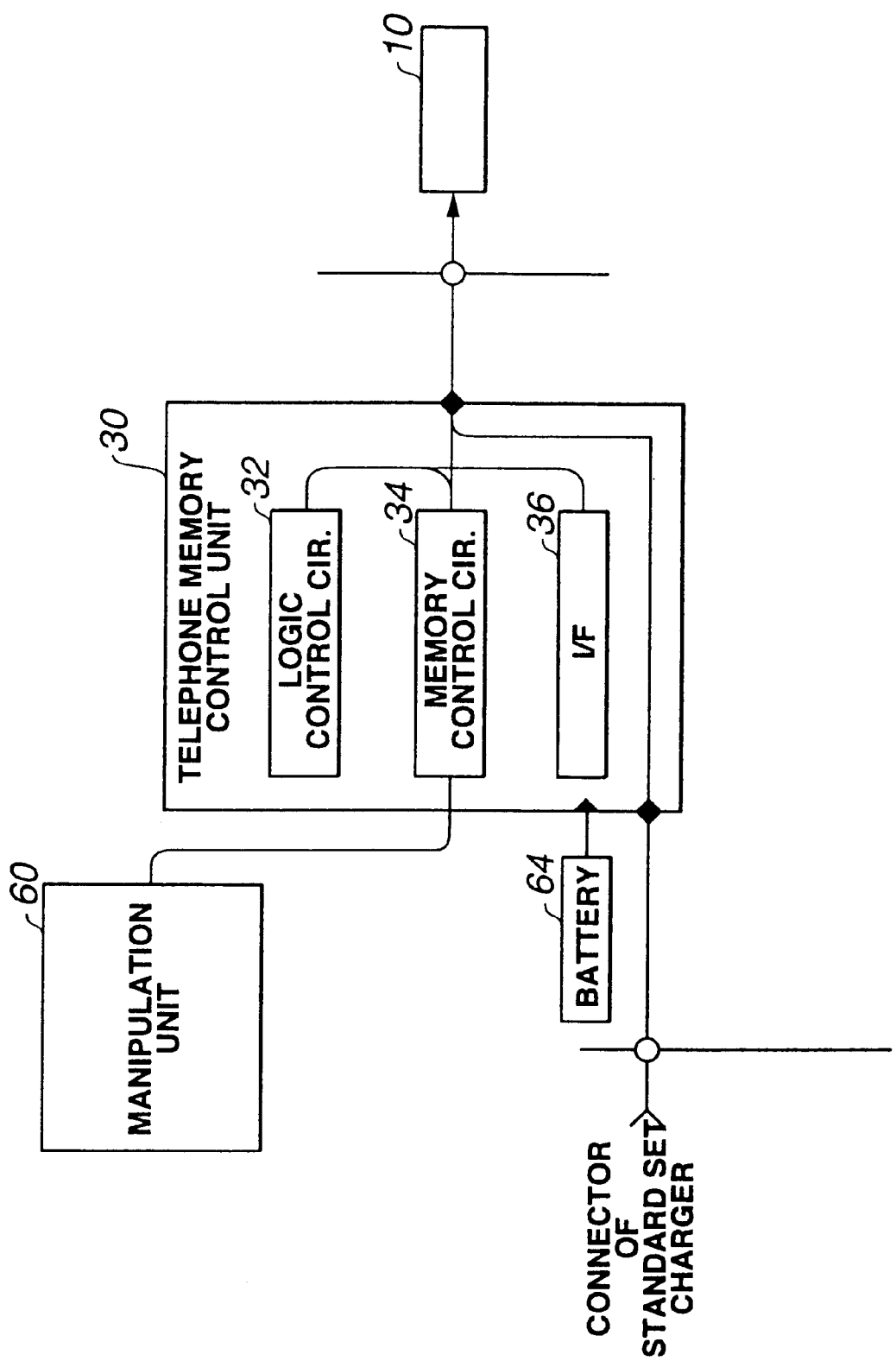
FIG. 5 is a block diagram showing the internal configuration of a data backup device to be connected to a charger according to another embodiment of the invention.

To perform data backup and charging on the cellular phone 10, the chargers 12 with a data backup function according to the above embodiments are equipped with the telephone memory control unit 30, the voltage conversion unit 40, and the charging control unit 50. In contrast, in a backup device shown in FIG. 5, a telephone memory control unit 30 is provided separately from and independently of the charging mechanism for the cellular phone 10. Because only the telephone memory control unit 30 is provided independently, this backup device has an advantage that its configuration is simplified and can be used easily being connected to a conventional charger.

Configured in the same manner as in the above embodiments, the telephone memory control unit 30 has a logic control circuit 32, a memory control circuit 34, and an interface 36. The logic control circuit 32 reads out data stored in the cellular phone 10 and storing them or transferring data to the cellular phone 10 in accordance with a manipulation that is input through a manipulation unit 60. The memory control circuit 34 stores party-on-the-other-end data or personal data that are stored in the cellular phone 10. The interface 36 controls data exchange between the telephone memory control unit 30 and the cellular phone 10.

This backup device does not control the charging mechanism directly. The telephone memory control unit 30 is directly connected to the cellular phone 10 bypassing the logic circuit 32. In other words, the backup device backs up data stored in the cellular phone 10 in a state that it is provided between the charger and the cellular phone 10. A battery 64 is used as a driving power source for the telephone memory control unit 30. The operation of the telephone memory control unit 30 is the sane as in the above embodiments and hence will not be described. Charging of the cellular phone 10 is started when the backup device is connected to the charger and the cellular phone 10. When the manipulation unit 60 is manipulated as necessary, data in the cellular phone 10 are backed up or backup data in the telephone memory control unit 30 are transferred to the cellular phone 10.

As described in the above embodiments, the cellular phone charger with a data backup function and the cellular phone backup device according to the invention can back up data of a cellular phone and re-store backup data in a cellular phone very easily because they allow the user to perform a data backup manipulation or a re-storing manipulation in performing a manipulation for charging the cellular phone. Where the user always uses a cellular phone, he needs to perform a charging manipulation frequently; in many cases, he needs to perform a charging manipulation on a regular basis, for example, every day. With the charger according to the invention, data can be backed up together with charging. This provides a great advantage that stored backup data can be updated to latest ones automatically every time charging is performed.

Since the backup device merely handles data stored in a cellular phone, it is not required to have a large memory capacity. Capable of being implemented as a small device, the backup device can be incorporated in a charger. Also where the backup device is used as an attachment to a charger, it can be implemented in a compact, easy-to-use form. Further, requiring no complex manipulations, the backup device can be handled by any person who has no special knowledge. Backing up party-on-the-other-end data or personal data stored in a cellular phone makes it possible to prevent such data from being scattered and lost and to thereby use the cellular phone more safely. There is another advantage that when switching is made to a new cellular phone or where customer data are shared by a plurality of cellular phones in a company, data can be used efficiently by writing them to the cellular phone(s).

I claim:

1. A charger to be connected to a cellular phone having a memory to charge a battery of the cellular phone, comprising:

a backup memory;

a charging control unit for converting an external voltage into a charging voltage and supplying the charging voltage to the battery of the cellular phone; and a telephone memory control unit for accessing the memory of the cellular phone, wherein the telephone memory control unit reads out data stored in the memory of the cellular phone and writes them to the backup memory, and reads out data stored in the backup memory and writes them to the memory of the cellular phone.

2. The charger according to claim 1, wherein the telephone memory control unit comprises:

a logic control circuit for performing control so as to read out the data stored in the memory of the cellular phone, and for performing control so as to write the data read out from the backup memory to the memory of the cellular phone;

a memory control circuit for writing the data read out from the memory of the cellular phone to the backup memory, and for reading out the data stored in the backup memory; and an interface for performing matching of electrical characteristics between the charger and the cellular phone, and for controlling signal timing.

3. The charger according to claim 1, wherein the telephone memory control unit further accepts a personal identification number from the cellular phone and performs an authentication operation on the accepted personal identification number.

4. The charger according to claim 1, further comprising a manipulation unit to be manipulated by a user in selecting one of two operation modes that are a backup mode in which data stored in the memory of the cellular phone are read out and written to the backup memory and a re-storing mode in which data stored in the backup memory are read out and written to the memory of the cellular phone.

5. The charger according to claim 1, further comprising an indicator for indicating completion of an operation of reading out data stored in the memory of the cellular phone and writing them to the backup memory, and an operation of reading out data stored in the backup memory and writing them to the memory of the cellular phone.

6. The charger according to claim 1, wherein the charger accepts, from the cellular phone, information indicating one of two operation modes that are a backup mode in which data stored in the memory of the cellular phone are read out and written to the backup memory and a re-storing mode in which data stored in the backup memory are read out and written to the memory of the cellular phone.

7. A data backup device to intervene between a cellular phone having a memory and a charger for supplying charging power to a battery of the cellular phone, comprising:

a backup memory;

a logic control circuit for performing control so as to read out data stored in the memory of the cellular phone, and for performing control so as to write data read out from the backup memory to the memory of the cellular phone;

a memory control circuit for writing the data read out from the memory of the cellular phone to the backup memory, and for reading out the data stored in the backup memory; and an interface for performing matching of electrical characteristics between the charger and the cellular phone, and for controlling signal timing.

* * * * *